United States Patent [19]

Baus

[11] Patent Number: 4,714,367
[45] Date of Patent: Dec. 22, 1987

[54] COUPLING ASSEMBLY FOR JOINING TWO PROFILED RAILS

[76] Inventor: Heinz G. Baus, 35 Wartbodenstrasse, CH-3626 Hünibach-Thun, Switzerland

[21] Appl. No.: 876,422

[22] Filed: Jun. 20, 1986

Related U.S. Application Data

[62] Division of Ser. No. 585,999, Mar. 5, 1984, Pat. No. 4,611,947.

[30] Foreign Application Priority Data

Mar. 19, 1983 [DE] Fed. Rep. of Germany ....... 3310005

[51] Int. Cl.4 .......................... F16B 7/00; F16D 1/12
[52] U.S. Cl. .................... 403/104; 403/205; 403/373; 403/403; 52/217; 49/505
[58] Field of Search .................. 403/104, 109, 16, 11, 403/373, 387, 403, 205, 255, 364, 405.1, 402; 52/584, 588, 35, 217, 213, 214; 49/504, 505; 411/900–903

[56] References Cited

U.S. PATENT DOCUMENTS

| | | | |
|---|---|---|---|
| 1,050,924 | 1/1913 | Dowd | 49/505 |
| 2,256,548 | 9/1941 | Chaffee | 52/217 X |
| 2,718,288 | 9/1955 | Boyer | 52/217 X |
| 2,742,117 | 4/1956 | Tolman | 49/505 X |
| 2,968,840 | 1/1961 | Morse | 411/901 X |
| 2,983,001 | 5/1961 | Guldager | 52/217 X |
| 3,018,861 | 1/1962 | Somville | 52/217 X |
| 3,520,084 | 7/1970 | Gigante | 49/504 X |
| 3,553,891 | 1/1971 | Casebolt et al. | 49/505 |
| 3,956,863 | 5/1976 | Tiedeken | 49/504 X |
| 4,011,700 | 3/1977 | Sado | 403/104 X |
| 4,021,129 | 5/1977 | Sykes | 403/252 |
| 4,251,962 | 2/1981 | Langenhorst | 49/504 |
| 4,372,082 | 2/1983 | Pagel | 49/505 |
| 4,447,055 | 5/1984 | Ahrens | 411/903 X |
| 4,453,346 | 6/1984 | Powell et al. | 49/505 X |
| 4,527,368 | 7/1985 | Jentoft | 52/213 X |

FOREIGN PATENT DOCUMENTS

| | | |
|---|---|---|
| 1654766 | 3/1972 | Fed. Rep. of Germany . |
| 2556396 | 6/1976 | Fed. Rep. of Germany . |
| 2820162 | 11/1978 | Fed. Rep. of Germany ........ 52/584 |
| 2812502 | 9/1979 | Fed. Rep. of Germany . |

Primary Examiner—Randolph A. Reese
Assistant Examiner—Peter M. Cuomo
Attorney, Agent, or Firm—Schwartz, Jeffery Schwaab, Mack, Blumenthal & Evans

[57] ABSTRACT

Coupling assembly joining two profiled rails, more particularly for use with a shower partition, the first profiled rail having an opening extending over its entire length and an inner space. A clamping element is mounted in this inner space and has a threaded hole in which a screw threads, the second profiled rail being secured to the first profiled rail by tightening of the said screw. In order to facilitate assembly and make it possible to carry out subsequent mutual alignment of the profiled rails with little effort, there is provided that the clamping element be insertable from the side and at right angles to the longitudinal direction of the first profiled rail through the above-mentioned opening and into the inner space, one leg of the second profiled rail passing through the opening into the inner space. This leg is clamped in a gap which is formed between a bearing surface of the clamping element and a web of the first profiled rail and/or a support element.

9 Claims, 5 Drawing Figures

COUPLING ASSEMBLY FOR JOINING TWO PROFILED RAILS

This is a division of application Ser. No. 585,999, filed Mar. 5, 1984, now U.S. Pat. No. 4,611,947.

BACKGROUND OF THE INVENTION

The present invention relates to an assembly for joining two profiled rails, more particularly of a shower partition; the first profiled rail having an opening extending essentially over its entire length and an inner space or chamber. Mounted in this inner chamber is a clamping element having a threaded hole into which a screw is threaded, the second profiled rail being adapted to be secured, in relation to the first profiled rail, by tightening the screw.

U.S. Pat. No. 4,021,129 describes an assembly for joining profiled rails in which the inner chamber and the opening, extending in the longitudinal direction in the first profiled rail, form an undercut longitudinal groove. The clamping element must be inserted into the longitudinal groove from an end face of the profiled rail. An angle piece is connected to the second profiled rail by means of screws and is mounted in a cavity therein. The clamping element and angle piece are connected together by means of screws. The outer surfaces of the profiled rails are butted together. Production of this joint requires a considerable amount of labour, since the individual components must be assembled consecutively and bolted together. Subsequent alignment of the profiled rails requires considerable effort since the whole assembly must first be practically dismantled.

German OS No. 2,556,396 describes a joint fitting for furniture which is in the form of a hollow body comprising chambers for the accommodation of nuts for bolts, the joint fitting being made in two parts and the nuts being placed in the chambers prior to assembly. The parts to be coupled by means of the joint fitting are provided with recesses into which the bolts are inserted. Both the joint fitting and the pieces of furniture comprise matching holes for the bolts. The pieces of furniture and the joint fitting are in specific alignment with each other, which makes subsequent alteration of adjustment impossible.

German OS No. 1,654,766 describes a frame or box skeleton the sections of which are coupled by means of separate angle pieces, bolts, nuts and clamping elements. The angle pieces and sections have matching holes through which the bolts are passed. Once the holes have been made in the sections, subsequent movement or alignment thereof is possible only if new holes are made.

Where profiled rails are to be coupled, there is a greater demand today than heretofore for simple and functional handling. This applies in particular to so-called extension or compensating sections which must be provided to compensate for tolerances arising at the construction site when a component is incorporated, for example a shower partition, a window frame or a door frame. It was hitherto considered sufficient to drill a hole subsequently in one of the profiled rails to be joined, at the required location, and then to use a bolt or the like to make the joint. In practice, this raises problems, some of them major, since drilling, sawing, filing etc., during assembly, are costly and time-consuming. Moreover, incorrect drilling, or the slipping of a drill, may damage the profiled rail as a whole, and the best position is often found by the assembler only after several tests, and this creates considerable additional work.

SUMMARY OF THE INVENTION

It is therefore an object of the invention to propose a low-cost assembly of this kind which provides a rapid and reliable joint or coupling between two profiled rails, the mutual alignment thereof being initially variable. The coupling is easy to make without additional tools and especially without cutting tools, but still ensures a functional and permanent joint between the rails. When required, it is possible to align the profiled rails, as desired, in relation to each other, to alter the geometrical position thereof and, thereafter, to unite them firmly together. The assembly meets high safety requirements and operational requirements and conditions. Handling and assembly of the rails is also facilitated.

In order to accomplish this object, it is proposed that the clamping element be inserted, from the side, preferably at right angles to the longitudinal direction of the first profiled rail, through the opening into the inner chamber, one leg of the second profiled rail passing through the opening into the inner chamber of the first profiled rail, the said leg being clamped in a gap located between a bearing surface on the clamping element and a clamping surface on a web on the first profiled rail and/or on a support element.

The assembly according to the invention provides a rapid but reliable joint between two profiled rails in a particularly simple and inexpensive manner. By means of the clamping element according to the invention, the leg of the second profiled rail may be secured in relation to the web of the first profiled rail. Geometrical alignment of the two profiled rails in relation to each other may be varied to a greater or lesser degree by pushing the leg more or less deeply into the gap, and the relevant edge conditions may be predetermined accordingly. This is highly significant, above all in connection with so-called extension and compensating profiled rails, especially since no metal removing processing of the profiled rails need be carried out at the construction site. The coupling is prepared at the manufacturer's plant. Assembly merely requires the two profiled rails to be inserted one into the other in the necessary manner, and to be aligned, whereupon the coupling is completed merely by tightening the screws. What is significant in this connection is that the profiled rails may first be provisionally aligned and assembled with no metal removing processing. Provisional locking and aligment is obtained by first tightening the screws, as a rule not too much. If necessary, this alignment may be altered by loosening the screws, after which the joint is locked in its final position by fully tightening the screws. According to the invention, the surface of the clamping element is large enough to prevent damage to the profiled rails. In order to facilitate assembly, the profiled rails are designed in such a manner that the leg of the second rail is adapted to be inserted from the side into the first profiled rail, the depth of insertion being predeterminable. If, for example, a rail is to be arranged vertically, the second profiled rail must be inserted into the first rail horizontally from the side, and this is easily accomplished even in cramped conditions. The depth of insertion may be predetermined as required, especially in order to compensate for inaccuracies at the construction site.

In one particular case, the leg of the second profiled rail comprises a slot running at least approximately at right angles to the longitudinal axis. The screw and/or the clamping element passes through this slot. This makes it possible to insert the second profiled rail into the first profiled rail, as required, and this movement is not restricted in any way by the screw or clamping element. According to the invention, the clamping element fits over this slot and must therefore absorb tensile or compressive forces.

The clamping element in particular, may be made of a glass fibre reinforced synthetic material in which the nut or threaded sleeve is embedded during production, more particularly by an injection-moulding process. The nut or threaded sleeve is integral with the clamping element which can be made of the required shape at low cost. The clamping element, the threaded sleeve and/or the internal thread may be made of the same material and in one piece. This applies both to a synthetic and to any other material, especially metal. The clamping element may also be a metal die-cast part incorporating the internal thread. From the point of view of production costs, however, the embedded threaded sleeve is the most satisfactory.

The clamping element may be substantially in the form of a plate and the surface thereof remote from the web of the profiled rail comprise a projection and/or stiffening ribs for the threaded sleeve. This provides a functional, space and weight saving clamping element using very little material.

In another particular embodiment, the distance between the outer and inner surfaces of the two webs of the first profiled rail, upon which the legs bear, is equal to that between the corresponding bearing surfaces of the legs of the second profiled rail. In contrast to known constructions, in which the legs engage over the outside of the webs, or vice-versa, and said legs and webs are in staggered engagement with each other. In a surprisingly simple manner, this provides a large number of possible variations in the further construction of the two profiled rails.

In order to facilitate rapid and simple assembly, one lateral surface of the clamping element bears against the first profiled rail, thus preventing rotation. On the one hand, this prevents the clamping element from becoming loose and falling out of the interior, during transportation, for example. On the other hand, it prevents the clamping element from rotating when the bolt is tightened. Moreover it eliminates the need for tools to hold the clamping element during assembly.

BRIEF DESCRIPTION OF THE DRAWINGS

The invention will be better understood by means of the description of embodiments thereof illustrated in the drawing attached hereto, wherein.

DETAILED DESCRIPTION OF PREFERRED EMBODIMENTS

Figure 1:
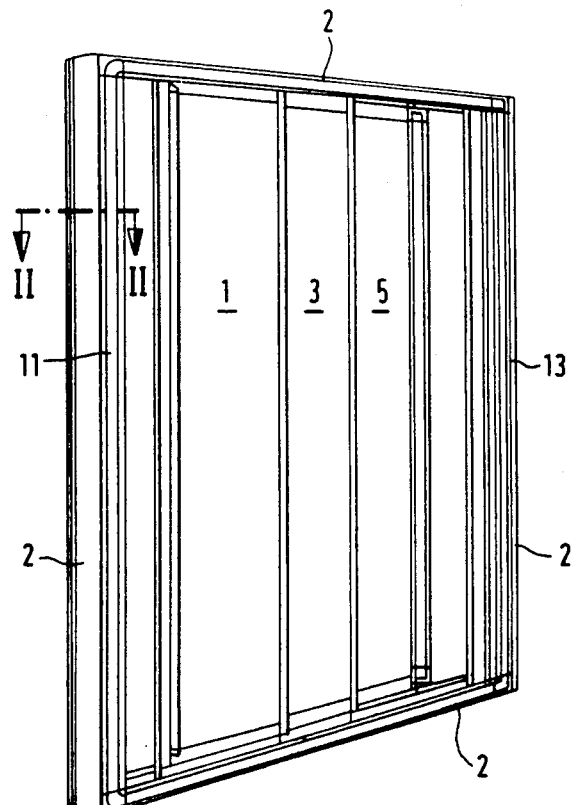
FIG. 1 is a perspective view of a shower-partition.

FIG. 1 is a diagrammatic representation of a shower partition, the frame of which consists of four profiled rails arranged at right angles.

Door panels 1, 3, 5, horizontally displaceable, are mounted in an upper horizontal profiled rail 2. The partition is generally disposed with its lower horizontal profiled rail 2 on the edge of a shower tub, while the two vertical profiled rails are attached to the wall of a room, or additional partitions are attached to them. Outer surfaces 13 of profiled rails 2, visible externally to an observer, in this case from the righthand side, are equipped with facing profiles 11. Subsequently connected to first profile rails 2 are second profiled rails, to be described hereinafter, in the form of extension, compensating or connecting profiles.

Figure 2:
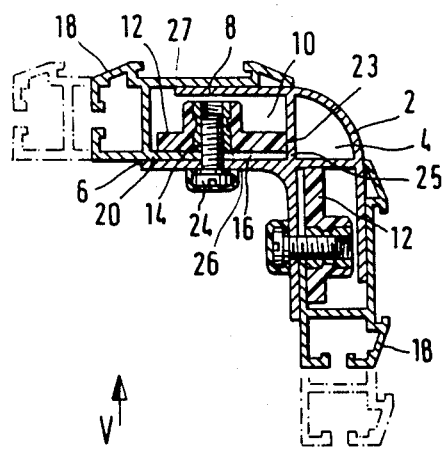
FIG. 2 is a cross-section of a shower partition embodiment in which the first profiled rail is in the form of a corner profiled rail.

FIG. 2 is a cross-sectional view showing first profiled rail 2, which is in the form of a corner section and has two matching lateral parts. For the sake of simplicity, only the left-hand part will be explained hereinafter. Longitudinal axis 4 of the said rail is at right angles to the plane of the drawing and the rail has two parallel webs 6, 8, between which is located an inner space 10 open on one side, in which a clamping element 12 is received. The interior of the latter comprises a nut or threaded sleeve 14, and a gap 16 is provided in relation to web 6. A second profiled rail 18 is provided which also has two legs 20, 27. Screwed into threaded sleeve 14 is a screw 24 which also passes through a hole in web 6. Tightening screw 24 unites leg 20 and web 6 firmly together and profiled rails 2 and 18 are finally connected together. Clamping element 12 is prevented from rotating in that lateral surface 23 bears upon a web 25 on first profiled rail 2.

Figure 3:
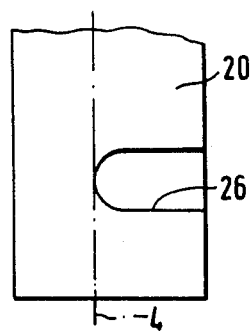
FIG. 3 is a view of the second profiled rail, as seen in the direction of arrow V in FIG. 2.

FIG. 3 is a view of second profiled rail 2 as seen in the direction of arrow V in FIG. 2. Also shown is leg 20 with its slot 26, screw 24, mentioned above, passing through this slot. In connection with FIG. 2 it may be seen that second profiled rail 18 can, if necessary, also be moved to the position shown in dotted lines and it can be locked in this position, in relation to first profiled rail 2, by tightening the screw. This movement is facilitated, very simply, by slot 26. Second profiled rail 18 may also be completely withdrawn from the first profiled rail. Conversely, the second profiled rail can be inserted, especially during the assembly of a shower partition, into the first profiled rail, equipped with the clamping element and screw, and can then be connected thereto by tightening screw 24.

Figure 4:
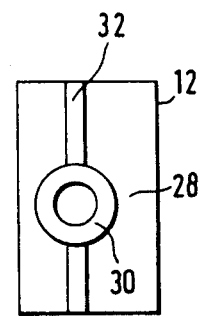
FIG. 4 is a view of the clamping element as seen in the direction of arrow VI in FIG. 2.

FIG. 4 is a view, as seen in the direction of arrow VI in FIG. 2, of clamping element 12. Located upon surface 28 is an annular extension 30 containing the said internally-threaded sleeve 14. Also visible are reinforcing ribs 32 which impart to the said clamping element sufficient stiffness to ensure a reliable connection. Clamping element 12 is preferably made of glass fibre reinforced plastic, but may also be a die-cast metal part. It has a comparatively large surface for clamping the leg. Reinforcing ribs 32 ensure satisfactory pressure distribution. Especially in the case of comparatively soft profiled rails, this clamping surface is necessary to prevent local overloading and thus deformation of the profiled rails. Damage to the rails is reliably avoided by suitable sizing of the bearing surface, even with repeated loosening and tightening of the screw. In addition to this, it should be emphasized that the surface of the leg in contact with the clamping element comprises ridges, grooves or the like and/or is suitably roughened, thus ensuring secure anchorage between the said clamping element and profiled rail. The ridges or the like preferably run in the longitudinal direction of the profiled rail, i.e. at right angles to the direction of insertion of the second profiled rail.

Figure 5:
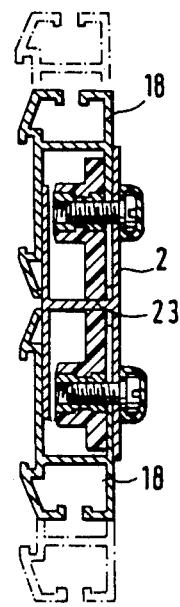
FIG. 5 is a cross-section of an embodiment intended for a frontal section.

The embodiment shown in FIG. 5 corresponds substantially to that in FIG. 2, except that in this case first profiled rail 2 is flat. In the manner already explained, two first profiled rails 18 may be moved to their respective dotted positions and may be connected accordingly to first profiled rail 2.

The above embodiments relate to profiled rails for a shower partition, but this is not intended to restrict the invention. It is expressly emphasized that, according to the invention, the said profiled rails are provided, in at least two areas, with clamping elements, screws and relevant slots and holes, for the purpose of ensuring an overall reliable and functional joint between them. According to the invention, additional clamping elements, with screws and so forth, may be distributed over the length of the said profiled rails.

I claim:

1. A coupling assembly comprising: a multi-walled first elongated profiled hollow rail having a longitudinal axis, an inner space running along said axis and an opening into the inner space of said rail, said opening extending essentially over the full length of said first rail and giving access to said inner space; a clamping element having a bearing surface and being constructed of a size and shape to allow passage thereof across said opening, said clamping element being formed with a threaded hole; means mounting said clamping element in said inner space for non-rotational but translational movement relative to said axis; means defining a fixed clamping surface in said inner space, said clamping surface and said bearing surface defining therebetween a clamping gap; said first profiled rail having a wall formed with a hole therethrough facing said threaded hole of said clamping member; a screw extending freely through said wall hole and screwed into said threaded hole of said clamping member, constructed so that rotation of said screw causes said translational movement of said clamping member and variation in the width of said clamping gap; and a second profiled rail having a leg inserted into said clamping gap, whereby rotation of said clamping screw in one direction produces a clamping pressure on said leg to secure said profiled rails together and rotation of said screw in reverse direction loosens said pressure and frees said profiled rails from one another so as to allow relative spatial adjustment of said rails, said second profiled rail having a longitudinal axis and said leg having a slot which extends into said leg from a free longitudinal edge of said leg substantially perpendicularly to the longitudinal axis of said second rail, and wherein said screw extends through said slot.

2. A coupling assembly according to claim 1, wherein said clamping element is made of glass fibre reinforced synthetic material, and comprising a sleeve-like member embedded in said material, said threaded hole being provided by said sleeve-like member.

3. An assembly according to claim 1, wherein said clamping element is in the form of a die-cast metal part and contains an internal thread forming said threaded hole.

4. An assembly according to claim 1, wherein said means defining said clamping surface is a web of said first rail and said clamping element is substantially in the form of a plate and comprises stiffening means on a surface thereof remote from said web.

5. A coupling assembly according to claim 1, wherein said leg of said second profiled rail is insertable into said first profiled rail through said opening and into the clamping gap, whereby said screw crosses said free longitudinal edge of said leg and passes into said slot.

6. A coupling assembly according to claim 1, wherein said second profiled rail is arranged substantially parallel to the longitudinal axis of said first profiled rail and is insertable transversely with respect to the longitudinal axis of said first profiled rail with said leg in said clamping gap between the bearing surface of said clamping element and the clamping surface of said first profiled rail, whereby said screw can be pushed into said slot 26 of said leg.

7. A coupling assembly comprising: a multi-walled first elongated profiled hollow rail having a longitudinal axis, an inner space running along said axis and an opening into the inner space of said rail, said opening extending essentially over the full length of said first rail and giving access to said inner space; a clamping element having a bearing surface and being constructed of a size and shape to allow passage thereof across said opening, said clamping element being formed with a threaded hole; means mounting said clamping element in said inner space for non-rotational but translational movement relative to said axis; means defining a fixed clamping surface in said inner space, said clamping surface and said bearing surface defining therebetween a clamping gap; said first profiled rail having a wall formed with a hole therethrough facing said threaded hole of said clamping member; a screw extending freely through said wall hole and screwed into said threaded hole of said clamping member, constructed so that rotation of said screw causes said translational movement of said clamping member and variation in the width of said clamping gap; and a second profiled rail having a leg inserted into said clamping gap, whereby rotation of said clamping screw in one direction produces a clamping pressure on said leg to secure said profiled rails together and rotation of said screw in reverse direction loosens said pressure and frees said profiled rails from one another so as to allow relative spatial adjustment of said rails, and wherein a lateral surface of the clamping element bears against a web of the first profiled rail for the purpose of preventing rotation of said clamping element.

8. A coupling assembly according to claim 5, wherein said clamping element is formed as a plate having said bearing surface on one side and an extension on the other side, said extension at least partially containing said threaded hole.

9. A coupling assembly comprising: a multi-walled first elongated profiled hollow rail having a longitudinal axis, an inner space running along said axis and an opening into the inner space of said rail, said opening extending essentially over the full length of said first rail and giving access to said inner space; a clamping element having a bearing surface and being constructed of a size and shape to allow passage thereof across said opening, said clamping element being formed with a threaded hole; means mounting said clamping element in said inner space for non-rotational but translational movement movement relative to said axis; means defining a fixed clamping surface in said inner space, said clamping surface and said bearing surface defining therebetween a clamping gap; said first profiled rail having a wall formed with a hole therethrough facing said threaded hole of said clamping member; a screw extending freely through said wall hole and screwed into said threaded hole of said clamping member, constructed so that rotation of said screw causes said translational movement of said clamping member and variation in the width of said clamping gap; and a second profiled rail having first and second substantially parallel legs, said first leg being inserted into said clamping gap, whereby rotation of said clamping screw in one direction produces a clamping pressure on said leg to secure said profiled rails together and rotation of said screw in reverse direction loosens said pressure and frees said profiled rails from one another so as to allow relative spatial adjustment of said rails, and said second leg overlying an outer surface of said first rail.

* * * * *